United States Patent [19]
Jörgens

[11] Patent Number: 5,246,574
[45] Date of Patent: Sep. 21, 1993

[54] APPARATUS FOR TREATING AND DISPOSING OF SOLID POLLUTANTS

[76] Inventor: Klaus Jörgens, Am Flöthen 98, 5600 Wuppertal 1, Fed. Rep. of Germany

[21] Appl. No.: 865,981

[22] Filed: Apr. 10, 1992

[30] Foreign Application Priority Data

Apr. 15, 1991 [DE] Fed. Rep. of Germany ....... 4112232

[51] Int. Cl.$^5$ ............................................. B01D 35/18
[52] U.S. Cl. ................................... 210/180; 210/175; 210/DIG. 7; 210/188
[58] Field of Search ............... 210/774, 770, 175, 180, 210/DIG. 7, 188; 34/69; 425/110

[56] References Cited

U.S. PATENT DOCUMENTS

| | | | |
|---|---|---|---|
| 3,779,679 | 12/1973 | Bisinella et al. | 425/110 |
| 4,872,998 | 10/1989 | Dausman et al. | 210/180 |
| 5,091,079 | 2/1992 | Gayman | 210/175 |

Primary Examiner—Robert A. Dawson
Assistant Examiner—Ana M. Fortuna
Attorney, Agent, or Firm—Michael M. Marinangeli

[57] ABSTRACT

A process and apparatus for treating and disposing of solid pollutants contained in liquids, in particular paint residues in water and/or solvents. The apparatus includes a power-driven heat-resistant surface formed by a turntable, a feed funnel for feeding liquid and/or paste containing solids onto the heat-resistant surface of the support table, a burner mounted underneath the support table for heating the heat-resistant surface of the support table, extracting ducts including a fan for removing the gases and vapors generated during the heat treatment of the liquid and/or paste containing solids, and removing blades for removing dried solids which remain on said heat-resistant support surface. All of the aforedescribed mechanisms and ducts can be mounted in a heat insulating housing.

9 Claims, 3 Drawing Sheets

APPARATUS FOR TREATING AND DISPOSING OF SOLID POLLUTANTS

BACKGROUND OF THE INVENTION

This invention relates to a process and an apparatus for treating and disposing of solid pollutants contained in liquids and in particular for disposing of paint residues contained in water and/or solvents.

Solids of this type are found in waste disposal plants, in paint manufacturing plants and painting lines and in various type of laboratories. Such wastes generally contain heavy metals, compounds of heavy metals, halogenated hydrocarbons, cyclic and polycyclic hydrocarbons and other chemical compounds.

A known technique for disposing of such pollutants is to reduce the volume of the liquid containing the solid pollutants or evaporate such liquid completely. The vapors and gases which are thereby generated are cleaned while the solid residues are disposed of, in a packed, non-compacted or wrapped up condition, as toxic wastes at a dump site or are incinerated.

SUMMARY OF THE INVENTION

It is a general object of this invention to provide a simple and effective process and an apparatus for carrying out such a process which is suitable for treating of solid residues at both laboratory and industrial scales.

Keeping this object in mind the invention contemplates providing an inventive process in which a layer of the liquid or paste containing the solids is placed on a hot moving surface and, after the liquids have evaporated, the solids are heated up to their decomposition temperatures. Thereafter the vapors and gaseous products of decomposition are trapped and conducted to a cleaning device. The remaining solids are then removed and from the surface and are mechanically disposed of.

As a result of the heat treatment being run at a temperature range from 200° to 500° C., and preferably from 300° to 400° C., the water and the solvent are evaporated while the chemical compounds are decomposed to such an extent that the gaseous products which are produced as result of the heat treatment can be trapped and conducted to a gas scrubber. The remaining solids which which do not decompose during the heat treatment contain the heavy metals and compounds of heavy metals, minerals, solid products of decomposition which form the solid wastes of the process. These solids are relatively small in quantity, can easily be separated in granular form from the moving surface of the apparatus of the invention and can be transported to a toxic waste dump site either in compacted or non-compacted form.

The apparatus for carrying out this process at a laboratory scale includes a surface in the form of a heat-resistant turntable. This turntable can be heated to the treatment temperature either by section or by heating the entire operative surface. One area of the turntable can be provided with with an applicator device in the form of blade which mounted radially relative to the turntable and forms a gap with table of 0.5 to 5 mm. The apparatus is also provided with a removal device which is also in the form of an upright blade mounted radially relative to the turntable and in close sliding contact with the turntable.

The apparatus for carrying out the process of the invention at a larger capacity scale, i.e. at an industrial scale, uses as the heat resistant surface a moving conveyor belt which passes through a thermally insulating housing. At one end of the conveyor belt the liquid and/or paste containing the solids is fed onto the conveyor belt and these solids, after having been subjected to heat treatment by the apparatus of the invention, are removed from the other end of the conveyor belt.

The blade which functions as an applicator device ensures that the liquid or paste which contains the solids is applied to the turntable at a defined layer thickness so that it is distributed uniformly on the turntable. The dried and decomposed solids are scraped away simultaneously by the other upright blade which is mounted so close to the turntable surface that no gap remains between it and the turntable.

Since the liquid or paste containing the solids is applied to the very hot turntable, a gaseous layer forms immediately between the turntable and the liquid or paste containing the solids. This gaseous layer prevents the solids from sticking so that the remaining dry solids can be easily removed from the turntable after the completion of the treatment process.

The turntable is preferably shaped slightly conically, so that the support surface slopes downwardly toward the rotational axis. The apparatus includes a continuous upright collar at the outer circumference of the turntable. At the rotation axis of the apparatus a pipe is provided which extends through the turntable and has an upper end forming an upright edge which slightly extends into the conically shaped turntable. This pipe serves as the discharge channel for the dried solids.

The heating unit for the apparatus in its simplest form includes a burner which is fired with gaseous or liquid fuel. This burner can be mounted immediately underneath the turntable so that the latter will be heated by the burner. Since the turntable rotates slowly around its axis, the turntable will soon reach a uniform temperature.

The system forming the apparatus of this invention is sealed as much as possible in order to minimize the heat losses and prevent the escape of gases from the apparatus so that these gases can escape essentially only through the extractor to be thereafter cleaned. The turntable is mounted in thermally insulated housing which includes a hot gas channel mounted underneath the turntable. An extractor hood is mounted above the turntable and essentially encloses and seals the turntable. An extractor duct encloses the the turntable and the extractor hood. The extractor duct can be in flow communication with the hot gas channel by means of a fan. When the apparatus is provided with such a fan the burner is preferably mounted in the hot gas channel, downstream from this fan. In this way the gases which are heated by the burner recirculate in a closed circuit within the thermally insulated housing; only the gases and vapors which are liberated during the heat treatment of the liquid or paste containing the solids are removed together with a portion of the burner waste gases from the extractor hood and transported to the gas scrubber unit.

BRIEF DESCRIPTION OF THE DRAWING

With these and other objects in view, which will become apparent in the following detailed description of the present invention, which is shown by example only, it will be clearly understood in connection with the accompanying drawing, in which.

DETAILED DESCRIPTION OF THE INVENTION

Figure 1:
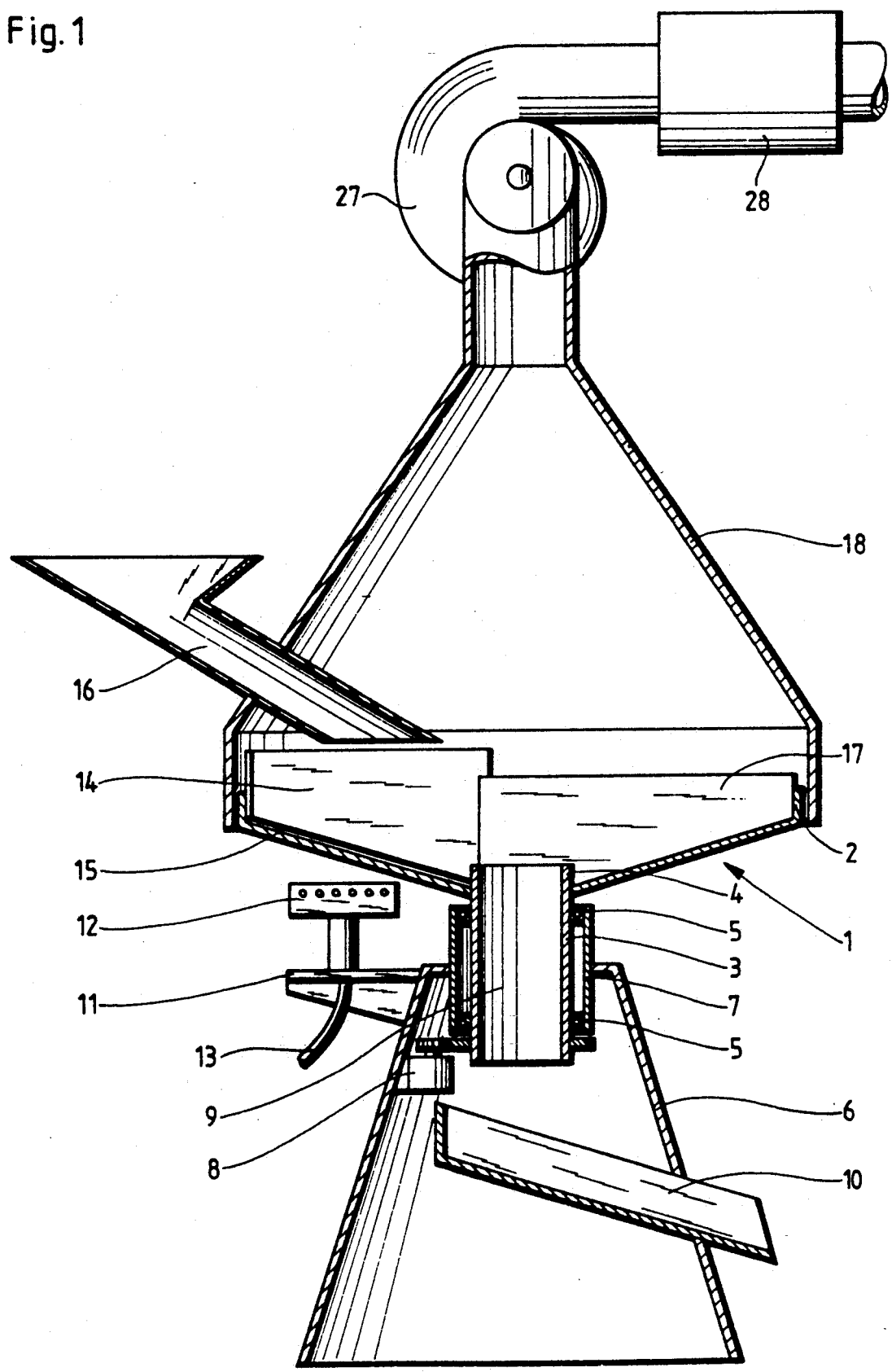
FIG. 1 is a longitudinal cross-sectional view through a first embodiment of an apparatus of the invention which is adapted for industrial or laboratory use depending on its size.

Referring now to the drawing there is schematically illustrated in FIG. 1 a turntable 1 having an upwardly extending collar 2 at its outer periphery. The turntable 1 is slightly conically shaped sloping downwardly toward its rotational axis. The turntable 1 is mounted on a concentric upright pipe 3, the upper end of which slightly protrudes into the turntable 1 as an upright collar 4. The concentric pipe 3 itself is rotatably mounted in a bushing 7 by means of a pair of roller bearings 5. The bushing 7 is fixedly mounted in a conical support 6. This conical support 6 serves as the base for the entire apparatus of the invention. A gear motor 8 meshes with a drive wheel 8' mounted on the concentric pipe 3 to slowly rotate the turntable 1. The pipe 3 defines a discharge channel 9 by means of its bore through which the treated solids are discharged. These treated solids are conducted via a chute 10 to the outside of the apparatus where they are collected and disposed of in a manner not illustrated. A bracket 11 is mounted on the conical support 6 and serves as a support for a gas-fired burner 12. This gas-fired burner 12 is mounted underneath the turntable 1 and heats the latter to the required treatment temperature between 200° to 500° C., and preferably from 300° to 400° C.

Gas supply conduit or pipe 13 supplies combustible gas to the burner 12.

A first coating blade 14 having a bottom surface which extends parallel to the surface of the turntable 1 at an adjustable distance therefrom is adjustably and radially mounted relative to this turntable 1. The bottom surface of this first blade 14 forms an adjustable gap 15 with the turntable 1 the width of which ranges from 0.5 to 5 mm. The width of the gap 15 determines the thickness of the layer of liquid or paste containing solids which is being fed into the apparatus and onto the turntable 1 through a feed funnel 16. The feed funnel 16 extends through an extractor hood 18 which is mounted above the turntable 1 and encloses an upright collar 2 of the turntable 1 to thereby enclose and essentially seal the turntable 1. A extraction fan 27 is mounted in this device to conduct the gases and vapors which are being generated during the heat treatment of the liquid or paste to a scrubber unit 28. Additional air is drawn into the device through the opening formed by the chute 10 and the discharge channel 9. This drawn in air serves to cool the pipe 3 and the pair of roller bearings 5. A second scraper blade 17 is mounted upright relative to the turntable in such a way that the dried solids formed on the surface of the turntable 1 are removed through the discharge channel 9 and the chute 10.

Figure 2:
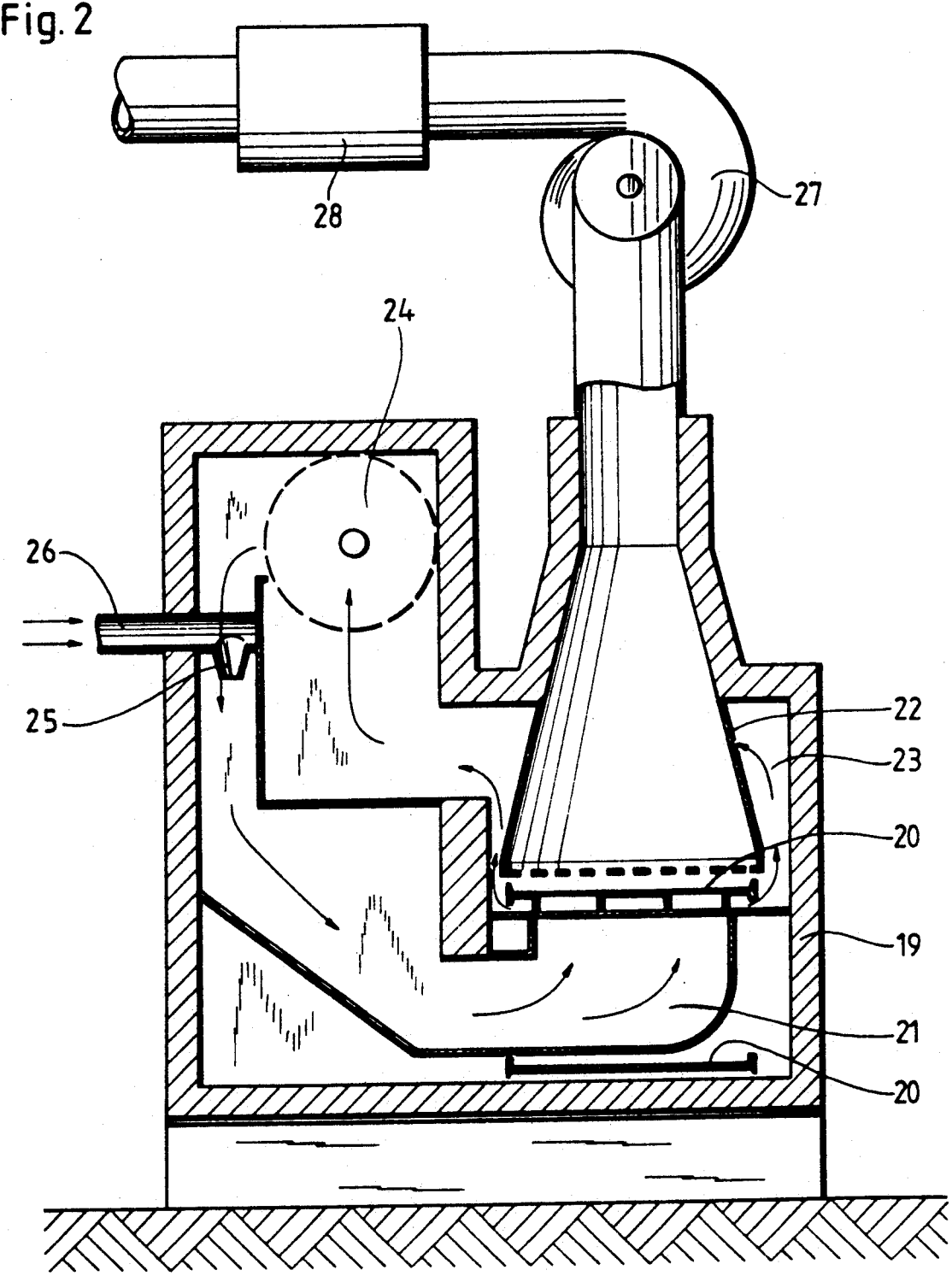
FIG. 2 is a schematic cross-sectional view of a second embodiment of the invention wherein the apparatus of the invention is mounted in thermally insulated housing.
Figure 3:
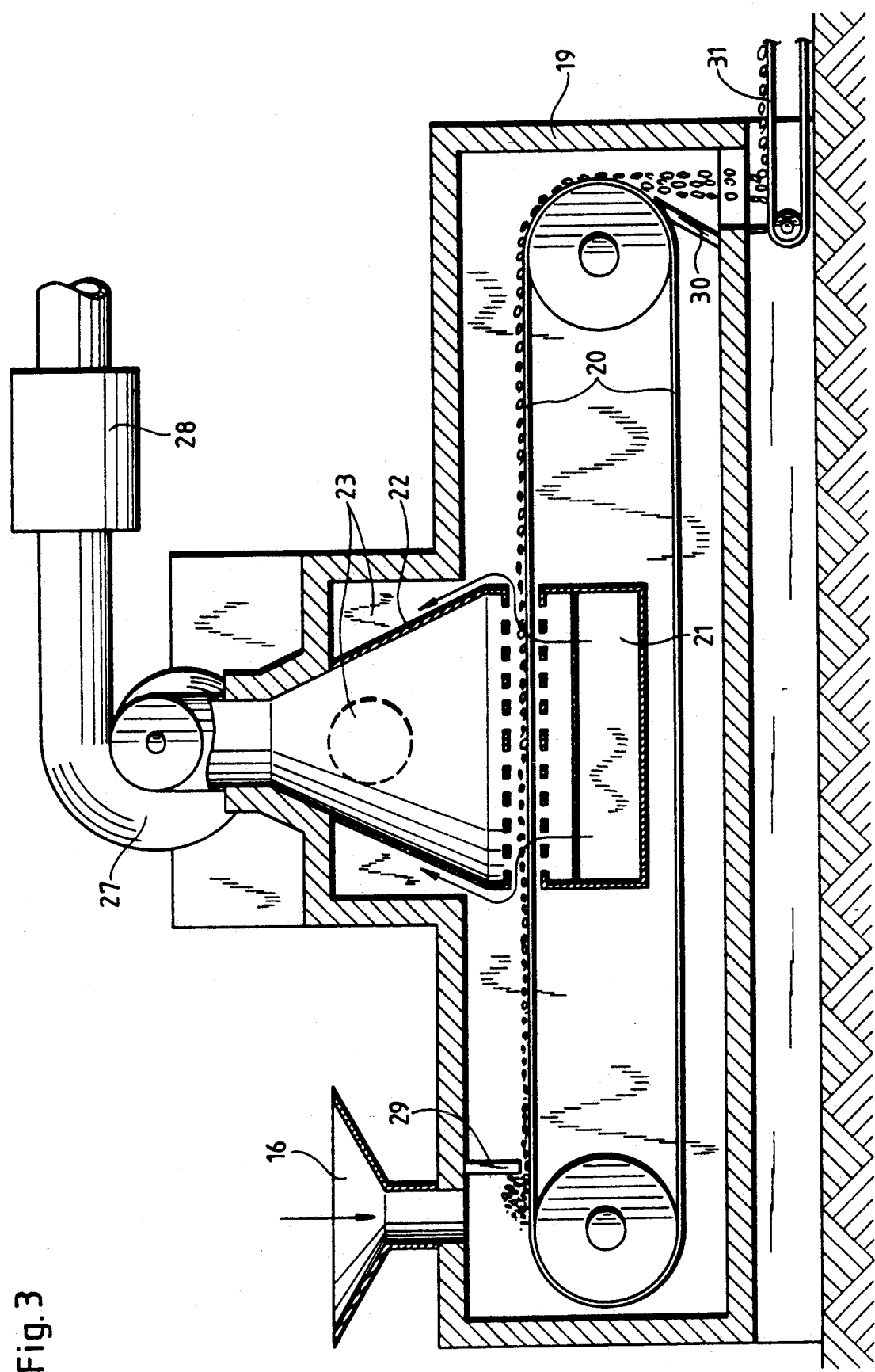
FIG. 3 is a longitudinal sectional view of the apparatus of FIG. 2.

The apparatus illustrated in FIGS. 2 and 3 represents a second alternate embodiment of the invention of a closed, thermally insulated system which includes a thermally insulating housing 19 in which a conventional conveyor belt 20 is mounted. Inside the housing 19 a hot gas channel 21 extends below the conveyor belt 20 and serves to distribute the hot gases below the conveyor belt 20 and distribute them over its undersurface so that gases may bypass the outer edge of the conveyor belt 20 and pass into an extraction duct 23. This embodiment also includes an extraction hood 22 which is closely mounted above the conveyor belt 20 so that only minimal quantities of the generated hot gases pass through the gap between the conveyor belt 20 and the extraction hood 22. The liquid and/or paste is fed onto the conveyor belt 20 through a feed tunnel 16 and is evenly distributed by means of the coating blade 29 which is mounted in the housing 19 as illustrated in FIG. 3.

The exhaust gases passing through the extractor duct 23 are transported by means of a suction fan 24 mounted in the housing 19 as illustrated in FIG. 2. The gases are recirculated by the fan 24 to the hot gas channel 21.

A burner 25 is mounted in the housing 19 downstream from the suction fan 24. A supply conduit 26 feeds a mixture of gas and air to the burner 25. A large part of the heat produced by the burner 25 is retained by means of the recirculation of the gases passing through the hot gas channel 21 and the extraction duct 23. In this way a relatively low burner capacity is sufficient to treat the liquid or paste containing the solids. The gases and vapors which are liberated by the treatment of the liquid and/or paste containing the solids are evacuated from the device through the extraction hood 22 by means of an extraction fan 27 together with a volume of gas corresponding to the volume of gas and air mixture injected into the system. Pollutants are removed from these gases and vapors via separate non-illustrated scrubber unit 28. The residual dried solids are removed from the conveyor belt 20 by means of a scraper blade 30 which is mounted in the housing as shown in FIG. 3. The scraped off solids are then evacuated from the apparatus by means of a second conventional conveyor belt 31 which is mounted as shown in FIG. 3, outside of the housing 19.

The embodiment illustrated in FIGS. 1 is of relatively compact size to be used on a laboratory scale. If larger quantities of liquids and/or pastes containing solids are to be treated, it is advantageous to provide a heat-resistant conveyor belt in lieu of the turntable as illustrated in FIGS. 2 and 3. In this second alternate embodiment liquid or paste containing solids are fed onto the inlet end of the conveyor belt and residual, dried solids are removed therefrom at the outlet end of the conveyor belt. A thermally insulating tunnel enclosing the conveyor belt can be provided for an efficient conservation of the heat energy produced in the process. The insulating tunnel is heated with hot gas and includes an extractor 27 fan for removing the liberated gases and vapors from the device and a scrubber unit 28 for retaining the pollutants contained in the gases and vapors.

While several specific embodiments of the invention have been illustrated and described in detail to illustrate the application of the principles of the invention, it will be understood that the invention may be embodied otherwise without departing from such principles.

What I claim is:

1. An improved apparatus for treating and disposing of solid pollutants contained in liquids, in particular paint residues in water and/or solvents, comprising in combination, a power-driven heat-resistant turntable, feed means for feeding liquid and/or paste containing solids on said heat-resistant turntable, heating means for heating said heat-resistant turntable up to the decomposition temperature of said solid residue, extracting means for removing the gases and vapors generated during the heat treatment of said liquid and/or paste containing solids, and removing means for removing dried solids which remain on said heat-resistant turntable, all of the aforesaid means and said heat resistant turntable being operatively mounted in said apparatus.

2. The improved apparatus as set forth in claim 1, wherein said feed means include a first blade radially mounted in said apparatus relative to said turntable, said blade having a lower surface which confronts said turntable and forms a gap therewith of about between 0.5 to 5 mm in width.

3. The improved apparatus as set forth in claim 1, wherein said removing means include a second blade radially mounted in said apparatus which also has a lower surface which confronts said turntable and is closely spaced therefrom.

4. The improved apparatus as set forth in claim 3, wherein said turntable has a conical configuration which slightly slopes downwardly with respect to the rotational axis of said turntable, said turntable having a circumferential upright first collar at its outer periphery, a pipe extending axially through said turntable, said pipe extending slightly above said turntable to form a central second upright collar therein.

5. The improved apparatus as set forth in claim 4, wherein said pipe serves as the outlet for the dried residual solids produced by the operation of said apparatus.

6. The improved apparatus as set forth in claim 1, wherein said heating means is a burner.

7. The improved apparatus as set forth in claim 6, wherein said burner is gas-fired and is operatively mounted in said apparatus underneath said turntable.

8. The improved apparatus as set forth in claim 6, wherein said apparatus is mounted inside a thermally insulating housing which includes a hot gas channel extending beneath said turntable, an extractor hood being mounted above said turntable inside said housing, said extractor hood having a downwardly extending collar which surrounds in close proximity thereto circumferential upright first collar thereby essentially sealing the circumferential the outer edge of said turntable, said housing also having an exhaust gas duct which surrounds said extractor hood, said hot gas channel and said exhaust gas duct being in flow communication with a fan mounted inside said thermally insulating housing.

9. The improved apparatus as set forth in claim 8, wherein said burner is mounted in said hot gas channel downstream from said fan.

* * * * *